(12) United States Patent
McNally (10) Patent No.: US 9,180,566 B2
(45) Date of Patent: Nov. 10, 2015

(54) FLEXIBLE ASSEMBLY PROCESS

(75) Inventor: John T. McNally, Berkley, MI (US)

(73) Assignee: Magna International Inc., Aurora, Ontario (CA)

( * ) Notice: Subject to any disclaimer, the term of this patent is extended or adjusted under 35 U.S.C. 154(b) by 478 days.

(21) Appl. No.: 13/239,694

(22) Filed: Sep. 22, 2011

(65) Prior Publication Data

US 2012/0073108 A1    Mar. 29, 2012

Related U.S. Application Data

(60) Provisional application No. 61/385,750, filed on Sep. 23, 2010.

(51) Int. Cl.
*B23P 21/00* (2006.01)
*B62D 65/18* (2006.01)

(52) U.S. Cl.
CPC ............... *B23P 21/004* (2013.01); *B62D 65/18* (2013.01); *B23P 2700/50* (2013.01); *Y10T 29/49826* (2015.01); *Y10T 29/51* (2015.01)

(58) Field of Classification Search
CPC .................................................. B23P 21/004
USPC ........... 29/429, 430, 431, 791, 793, 794, 822, 29/823, 783, 795, 33 R, 564, 564.1, 33 K, 29/50; 198/340, 343.1
See application file for complete search history.

(56) References Cited

U.S. PATENT DOCUMENTS

| | | | | |
|---|---|---|---|---|
| 4,679,297 | A * | 7/1987 | Hansen et al. | 483/1 |
| 5,724,724 | A * | 3/1998 | Kugo | 29/787 |
| 7,178,660 | B2 * | 2/2007 | Dehne et al. | 198/463.1 |
| 2006/0226197 | A1* | 10/2006 | Degain et al. | 228/49.6 |
| 2008/0084013 | A1* | 4/2008 | Kilibarda | 269/37 |
| 2009/0078741 | A1* | 3/2009 | Sata et al. | 228/6.1 |

* cited by examiner

*Primary Examiner* — David Bryant
*Assistant Examiner* — Steven A Maynard
(74) *Attorney, Agent, or Firm* — Dickinson Wright PLLC (57) ABSTRACT

An assembly line system comprises a plurality of cassette-type tooling elements and a plurality of moveable base modules. The tooling elements and the base modules have complementary mounting structures for supporting detachable mounting of the tooling elements onto the base modules. A driving system drives each base module to a respective first position within a product assembly area for the assembling a first product, and drives each base module to a respective second position within the product assembly area for assembling a second product. When the first product is dimensionally different than the second product, the respective first position is different than the respective second position for at least one of the plurality of base modules.

8 Claims, 8 Drawing Sheets

FLEXIBLE ASSEMBLY PROCESS

This application claims the benefit of U.S. Provisional Patent Application No. 61/385,750, filed on Sep. 23, 2010, the entire contents of which are incorporated herein by reference.

FIELD OF THE INVENTION

The instant invention relates generally to the field of manufacturing processes, and more particularly to a flexible assembly line process and system.

BACKGROUND OF THE INVENTION

An assembly line is a manufacturing process in which parts are added to a product in a sequential manner to create a finished product much faster than is possible using handcrafting-type methods. The automotive industry is one example of an industry that utilizes assembly line manufacturing processes. Briefly, different manufacturing steps are performed repeatedly at various stations, which typically are arranged along main assembly lines and sub-assembly lines. By way of a specific and non-limiting example, truck frame front modules and rear modules are assembled at respective stations of sub-assembly lines, and are assembled together subsequently at a marriage station of the main assembly line. Efficiency is achieved in an assembly line manufacturing process due to the division of labor and specialization that results from individuals performing the same task over and over, and due to the fact that many different steps of the assembly process can be performed simultaneously at different stations along the assembly line.

Today, industrial robots perform many of the tasks at the different stations of an assembly line manufacturing process, such as for instance welding, riveting, bolting, painting etc. In a typical automobile assembly line, each station is based on a dedicated tool including a base that is mounted to the floor. A plurality of tooling elements is mounted to the base, providing a predetermined arrangement of tooling elements for performing predetermined assembly steps of the assembly of a predetermined product. These bases have standard heights, widths, and mounting patterns and can be removed and replaced by other bases, having different tooling elements mounted thereto, when it is necessary to retool the assembly line in order to make a different product. Continuing with the truck frame assembly example, the tooling elements that are mounted to the base module may include fixtures for holding the individual frame components in a secure fashion while robots fasten the frame components together, such as by welding.

Of course, an assembly line is most efficient when it is used to produce only one type of product. In that case, every product that comes off the assembly line is identical, and there is no need to change the arrangement of the tooling elements that are employed in the assembly line. Accordingly, the amount of downtime of the assembly line is minimized.

Unfortunately, vehicle purchasers have varying requirements and preferences, and therefore it is not desirable for a manufacturer to offer just one type of vehicle. For instance, the Ford Motor Company offers a number of different truck families, including the F-150, F-250, F-350, F-450, and F-550. Within each family, a number of different length variants are also available, such as for instance the F-150 regular cab with a 6.5' box, the F-150 regular cab with an 8' box, the F-150 super cab with a 6.5' box, the F-150 super cab with an 8' box and the F-150 super crew. It would be impractical to build and operate a different assembly line facility for manufacturing each one of the above-mentioned truck variants. Rather, in view of the high capital costs that are associated with modern automotive assembly line facilities, it is necessary to use the same assembly line for manufacturing a plurality of length variations within a family of vehicles, or even for manufacturing entirely different families of vehicles.

Clearly, a problem may arise when the decision is made to stop production of one product, such as for instance the F-150 regular cab with a 6.5' box, and begin production of a different product, such as for instance the F-150 regular cab with an 8' box. In this specific and non-limiting example, the different length of the longitudinal frame rails and/or the different spacing between cross members in the two types of truck frames necessitates a different mounting arrangement of the tooling elements on the base modules. Further, different types of truck frames may require different processes, for instance joining by welding instead of, or in addition to, riveting.

Since the stations of a typical assembly line are based on dedicated tools, in order to assemble a different product it is necessary to remove and replace the bases and associated tooling elements of the assembly line with different bases having different associated tooling elements. Unfortunately, the process of switching the dedicated tools is currently done manually and results in substantial downtime, ranging from between typically half an hour to half a day, depending on the nature of the differences between the current product and the next product.

Prior attempts have been made to mitigate some of the problems that are encountered when assembly line production is switched from one product to another. For instance, in order to accommodate different vehicle frame lengths it is known to put part of a dedicated tool on pneumatically driven sliders, which are mounted onto a base. According to this approach, a fixed tool is provided with a limited amount of variability for accommodating different rear frame modules. When production is switched from one product to another, the sliders are driven to a predetermined location that depends upon the length of the new product. Unfortunately, idle stations are required when this solution is implemented since the sliders can be used to adapt the tool to accommodate only a limited amount of length variation.

It would be desirable to provide a method and a system that overcome at least some of the above-mentioned limitations of the prior art.

SUMMARY OF EMBODIMENTS OF THE INVENTION

In accordance with an aspect of an embodiment of the invention, there is provided an assembly line system, comprising: a plurality of tooling elements; a plurality of moveable base modules, each base module having a mounting structure for detachably receiving a tooling element of the plurality of tooling elements; and, a driving system for driving each base module to a respective first position for the assembly of a first product and for driving each base module to a respective second position for the assembly of a second product, wherein the first product is dimensionally different than the second product and wherein for at least one of the plurality of base modules the respective first position is different than the respective second position.

In accordance with an aspect of an embodiment of the invention, there is provided an assembly line system, comprising: a plurality of base modules, each base module of the plurality of base modules being moveable relative to each of the other base modules of the plurality of base modules for supporting variable spacing between said base modules within a product assembly area, and each base module of the plurality of base modules being movable between the product assembly area and a tool-mounting area; a plurality of tooling elements for being detachably mounted to the base modules when the base modules are within the tool-mounting area and for performing an assembly function when the base modules are within the product assembly area; a driving system for driving the plurality of base modules between the product assembly area and the tool-mounting area and for driving each base module of the plurality of base modules to a predetermined position within the product assembly area; wherein the assembly line system supports assembly of a first product and of a second product that is dimensionally different than the first product, and wherein at least one base module is driven to a first predetermined position within the product assembly area for assembly of the first product and is driven to a second predetermined position within the product assembly area for assembly of the second product.

In accordance with an aspect of an embodiment of the invention, there is provided a method of operating an assembly line, comprising: providing an indication of a product that is to be assembled using the assembly line; providing a plurality of moveable base modules, each one of the plurality of moveable base modules carrying a detachably mounted tooling element; moving each one of the plurality of moveable base modules to a predetermined location within a product assembly area of the assembly line; and, assembling the indicated product using the tooling elements carried on the plurality of moveable base modules, wherein for different indicated products at least some base modules of the plurality of base modules are moved to different predetermined positions.

According to an aspect of at least one embodiment of the instant invention, the driving system is controlled using a programmable logic controller (PLC).

According to an aspect of at least one embodiment of the instant invention, each tooling element of the plurality of tooling elements is a "tool cassette."

According to an aspect of at least one embodiment of the instant invention, each tool cassette has a mounting structure for coupling with a complementary mounting structure of one of the moveable base modules.

According to an aspect of at least one embodiment of the instant invention, the driving system comprises guide rails or guide tracks extending between an assembly area and a tool mounting area.

According to an aspect of at least one embodiment of the instant invention, a robot proximate the tool mounting area is provided for mounting the tool cassettes on the complementary mounting structure of the moveable base modules.

BRIEF DESCRIPTION OF THE DRAWINGS

Exemplary embodiments of the instant invention will now be described in conjunction with the following drawings, wherein like numerals represent like elements, and in which.

DETAILED DESCRIPTION OF THE DRAWINGS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
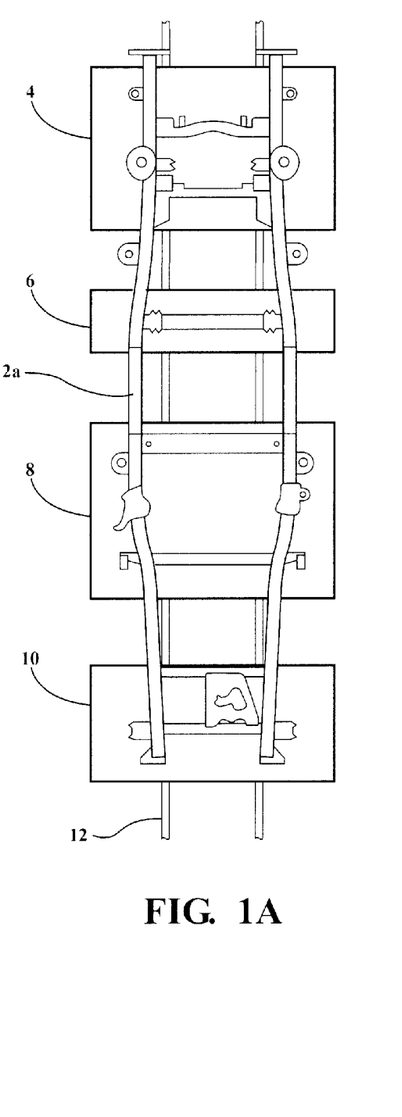
FIG. 1a is a top view showing a system according to an embodiment of the instant invention in a first configuration for assembling a first product.
Figure 1B:
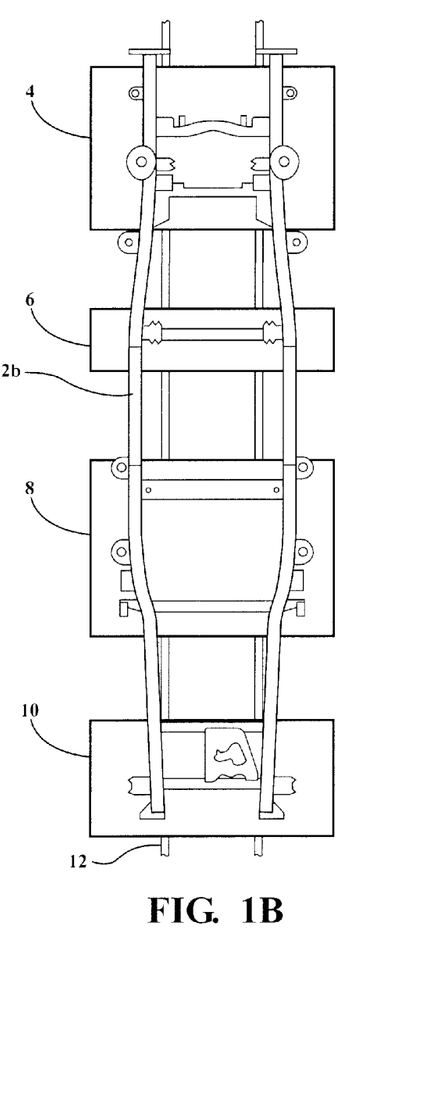
FIG. 1b is a top view showing the system of FIG. 1a in a second configuration for assembling a second product.

FIG. 1a is a top view showing a system according to an embodiment of the instant invention in a first configuration for assembling a first product. FIG. 1b is a top view showing the system of FIG. 1a in a second configuration for assembling a second product. By way of a specific and non-limiting example, the system that is shown in FIGS. 1a and 1b is implemented in a vehicle assembly line, and more particularly in a truck frame assembly line. As such, FIG. 1a shows a configuration of the system during assembly of a truck frame for a F-150 regular cab with a 6.5' box (frame shown at 2a), and FIG. 1b shows a configuration of the system during assembly of a truck frame for a F-150 regular cab with an 8' box (frame shown at 2b).

The system that is shown in FIGS. 1a and 1b includes a plurality of moveable bases 4, 6, 8, 10, to which different tooling elements can be detachably mounted. Guide tracks or rails 12, or another suitable guiding structure, are provided along the ground beneath the moveable bases 4, 6, 8, 10. The guide tracks 12 extend between an assembly area, which is shown in FIGS. 1a and 1b, and a not illustrated tool mounting area. A driving system drives the moveable bases 4, 6, 8, 10 between respective first positions shown in FIG. 1a for assembling the first product 2a, and respective second positions shown in FIG. 1b for assembling the second product 2b. By way of a specific and non-limiting example, the driving system 12 is a servo controlled, rack and pinion drive system. The drive system is controlled by a programmable logic controller (PLC), or by another suitable controller unit or a plurality of separate controller units, which receives base module position data and provides control signals to the driving system 12.

Figure 2A:
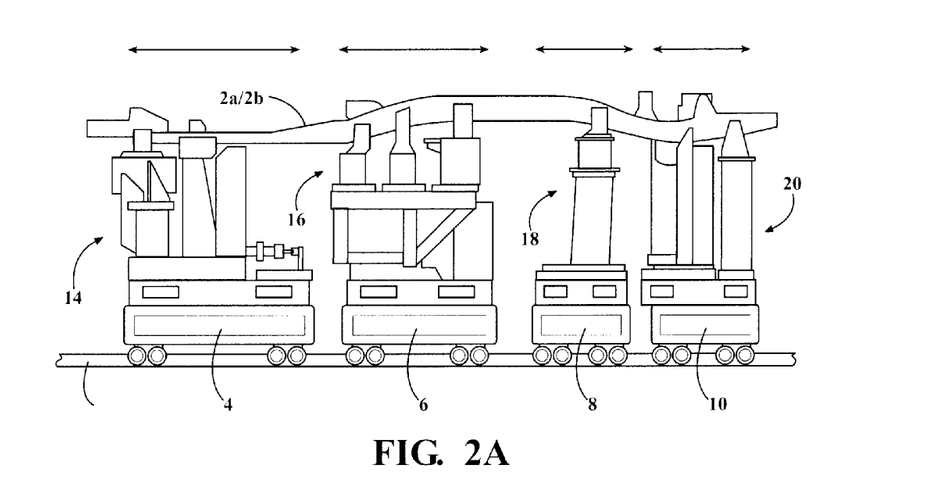
FIG. 2a is a side view showing the system of FIG. 1a with the base modules positioned in an assembly area.

Referring now to FIG. 2a, shown is a side view of the system of FIG. 1a with the base modules 4, 6, 8, 10 located in the product assembly area. During use, the base modules 4, 6, 8, 10 are guided along the guide track 12 in the direction of the double-headed arrows in order to support assembly of the product frame 2a or 2b. The system that is shown in FIG. 2a includes a plurality of tooling elements 14, 16, 18, 20, each of the tooling elements 14, 16, 18, 20 being detachably mounted to a respective one of the base module 4, 6, 8, 10. In the example that is shown in FIG. 2a, each tooling element 14, 16, 18, 20 includes a fixture disposed at a fixture end thereof for securing frame components in position for being welded or riveted etc. by robots, which are located adjacent to the product assembly area.

Figure 2B:
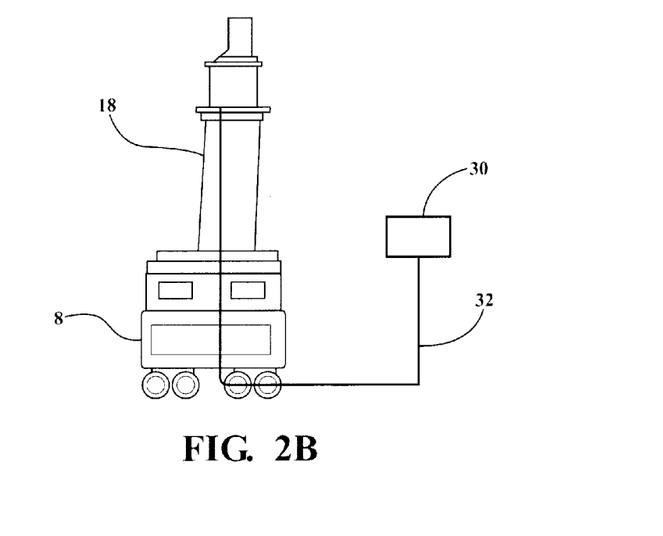
FIG. 2b is a side view showing a communication pathway extending from a PLC to a tooling element mounted on a base module.
Figure 2C:
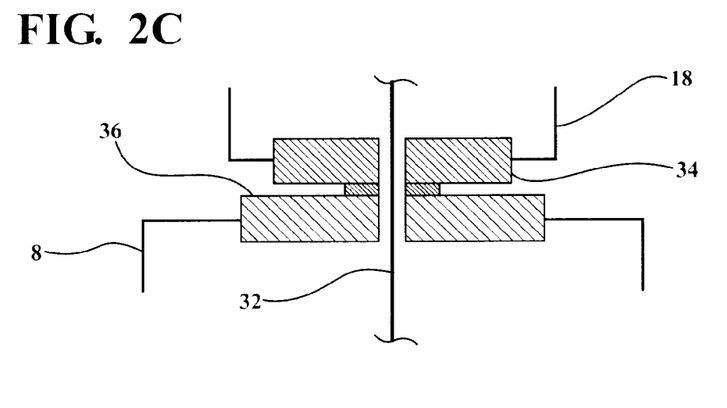
FIG. 2c is an enlarged side view showing the mounting structure of the base module and the mounting structure of the tooling element.

The plurality of tooling elements 14, 16, 18, 20, in aggregate, function in a manner that is analogous to a dedicated tool mounted on a single, fixed base in a typical assembly line of the prior art. However, since each tooling element of the plurality of tooling elements 14, 16, 18, 20 has a cassette (modular) construction, the individual tooling elements can be mounted onto separate base modules and variably spaced one from another. As is shown in FIG. 2b, for a representative base module 8 and tooling element 18, the PLC 30 controls not only the position of the moveable bases 4, 6, 8, 10 but also the function of the tooling elements 14, 16, 18, 20, such as, for instance, controlling, which clamps to fire and which clamps to release, etc. As is shown in FIG. 2c, in an enlarged view of a portion of the representative base module 8 and tooling element 18, a mounting structure 34 of tooling element 18 detachably engages a complementary mounting structure 36 of the base module 8, thereby securing the tooling element 18 to the base module 8 and completing a communication pathway between the PLC 30 and the tooling element 18. As such, commands from the PLC 30 pass up to the tooling elements 14, 16, 18, 20 via respective base modules 4, 6, 8, 10.

Figure 3:
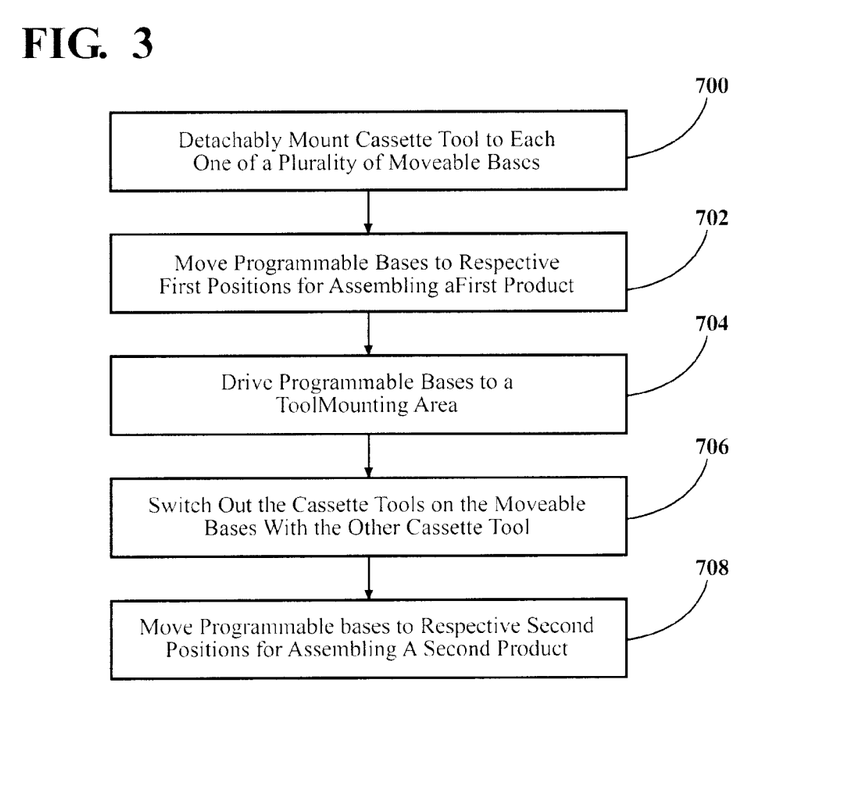
FIG. 3 is a side view of the system of FIG. 1a with the base modules positioned in a tool mounting area.

FIG. 3 is a side view showing the system described above with reference to FIGS. 1a-2c with the base modules positioned in a tool mounting area. Tooling elements 14, 16, 18, 20 are stored on robot accessible shelves 22, which are located adjacent to the tool mounting area. An industrial robot 24 is also provided adjacent to the tool measuring area. During use, the base modules 4, 6, 8, 10 are moved along guide track 12 from the product assembly area to the tool mounting area, which is close to the robot 24. Subsequently, using the robot 24, tooling elements 14, 16, 18, 20 are transferred onto and detachably mounted to respective ones of the base modules 4, 6, 8, 10. The particular tooling elements 14, 16, 18, 20 that are mounted onto the base modules are selected in dependence upon the product that is to be assembled. Under the control of PLC 30, tooling elements 14, 16, 18, 20 are removed from base modules 4, 6, 8, 10 and replaced with different tooling elements 14, 16, 18, 20 in an automated fashion. When it is necessary to retool an assembly line in order to stop assembling one product and begin assembling a different product, the base modules 4, 6, 8, 10 are moved from their respective positions in the product assembly area, into the tool mounting area where new tooling elements are detachably mounted onto the base modules 4, 6, 8, 10, and then returned to their respective positions in the product assembly area. Performing this series of steps takes a robot 24 at each station approximately five minutes or less. Accordingly, an assembly line can be retooled to produce a different product in a manner of minutes.

Figure 4A:
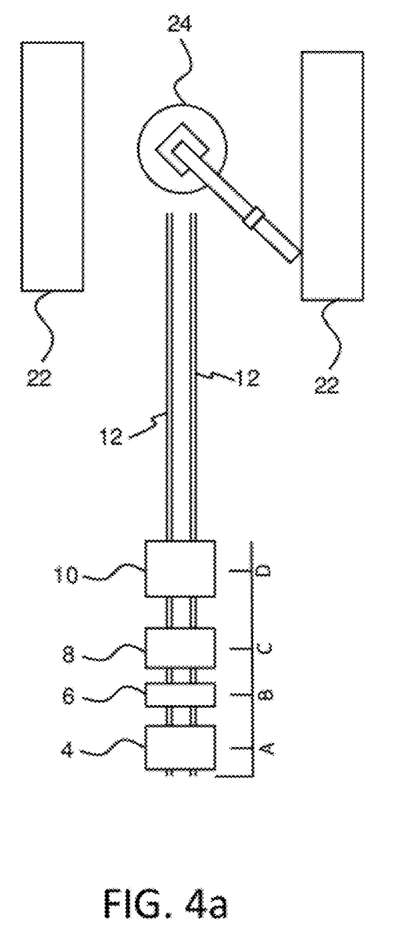
FIG. 4a is a top view showing a system according to an embodiment of the instant invention, with base modules positioned in an assembly area for assembling a first product.
Figure 4B:
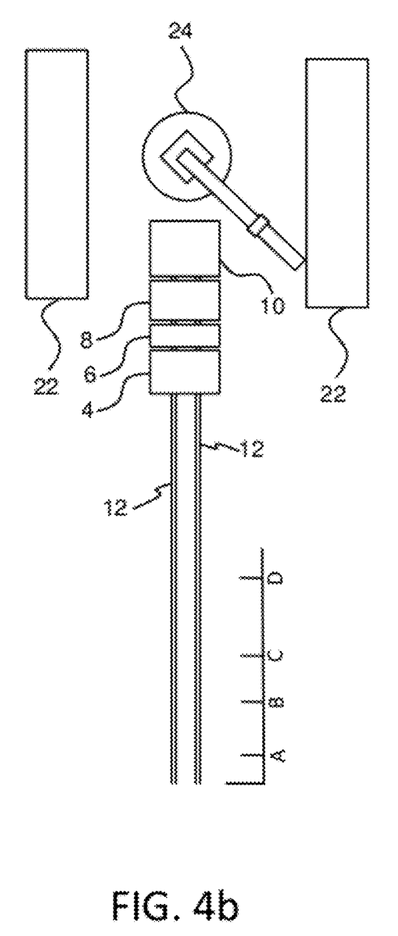
FIG. 4b is a top view of the system of FIG. 4a, with the base modules positioned in a tool mounting area for receiving tool cassettes for assembling a second product.
Figure 4C:
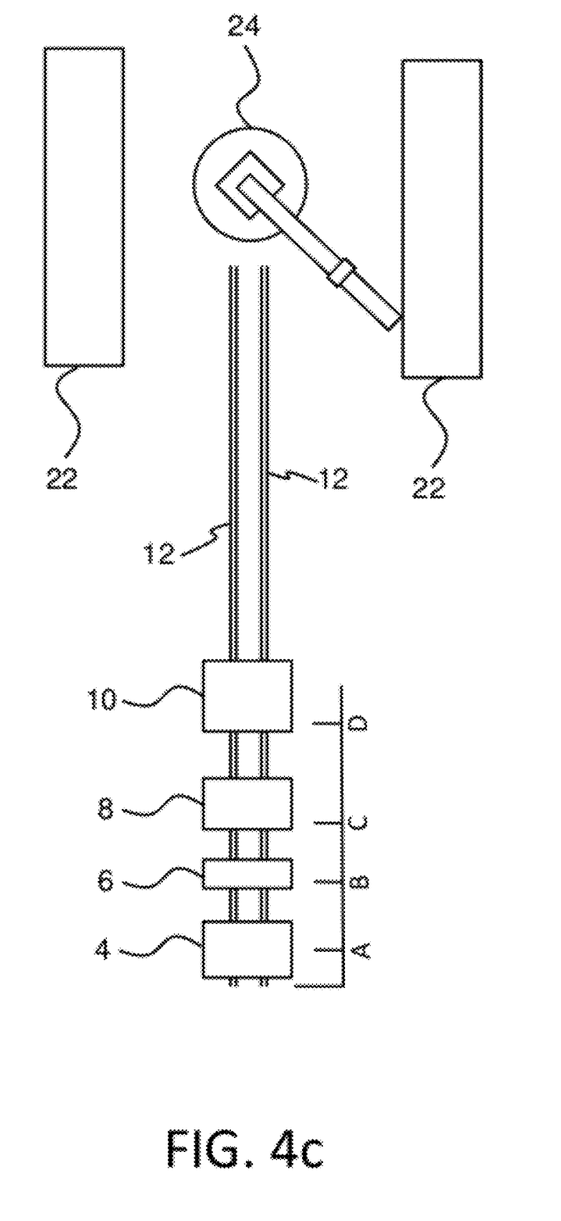
FIG. 4c is a top view of the system of FIG. 4a, with the base modules positioned in the assembly area for assembling the second product.

FIGS. 4a to 4c illustrate in greater detail the steps that are performed during retooling of one assembly line station. It should be noted that similar steps are performed substantially simultaneously at each assembly line station of the assembly line. FIG. 4a is a top view showing a system according to an embodiment of the instant invention, with the base modules 4, 6, 8, 10 positioned in an assembly area for assembling a first product. In FIG. 4a, the base modules 4, 6, 8, 10 are at predetermined positions A, B, C and D, respectively. FIG. 4b is a top view of the system of FIG. 4a, with the base modules 4, 6, 8, 10 positioned in a tool mounting area for receiving tool cassettes for assembling a second product. FIG. 4c is a top view of the system of FIG. 4a, with the base modules positioned in the assembly area for assembling the second product. In FIG. 4c, at least some of the base modules 4, 6, 8, 10 are located at a new predetermined position, offset from the respective predetermined position A, B, C and D, respectively. In other words, the separation distance between at least two of the base modules is different in the new predetermined position than it was in the original predetermined position. For instance, in the configuration that is shown in FIG. 4c the frame that is being assembled is a longer length variant compared to the frame that is assembled using the configuration shown in FIG. 4a.

Referring still to FIGS. 4a-4c, initially a first product having a first length is assembled, using the configuration of the system that is shown in FIG. 4a. When it is necessary to stop assembling the first product and begin assembling a second product having a second length longer than the first length, then an indication is provided and the moveable bases 4, 6, 8, are moved out of the product assembly area along guide track 12 toward the robot 24. The robot 24 replaces at least some tooling elements with different tooling elements, which are retrieved from storage locations on robot accessible shelves 22. Finally, the moveable bases 4, 6, 8, 10 move away from the robot along guide track 12 and are positioned at respective predetermined positions within the product assembly area. Optionally, when none of the tooling elements are changed, the moveable bases are simply repositioned from their respective first predetermined positions A, B, C and D, shown in FIG. 4a, to respective second predetermined positions, shown in FIG. 4c.

Figure 5:
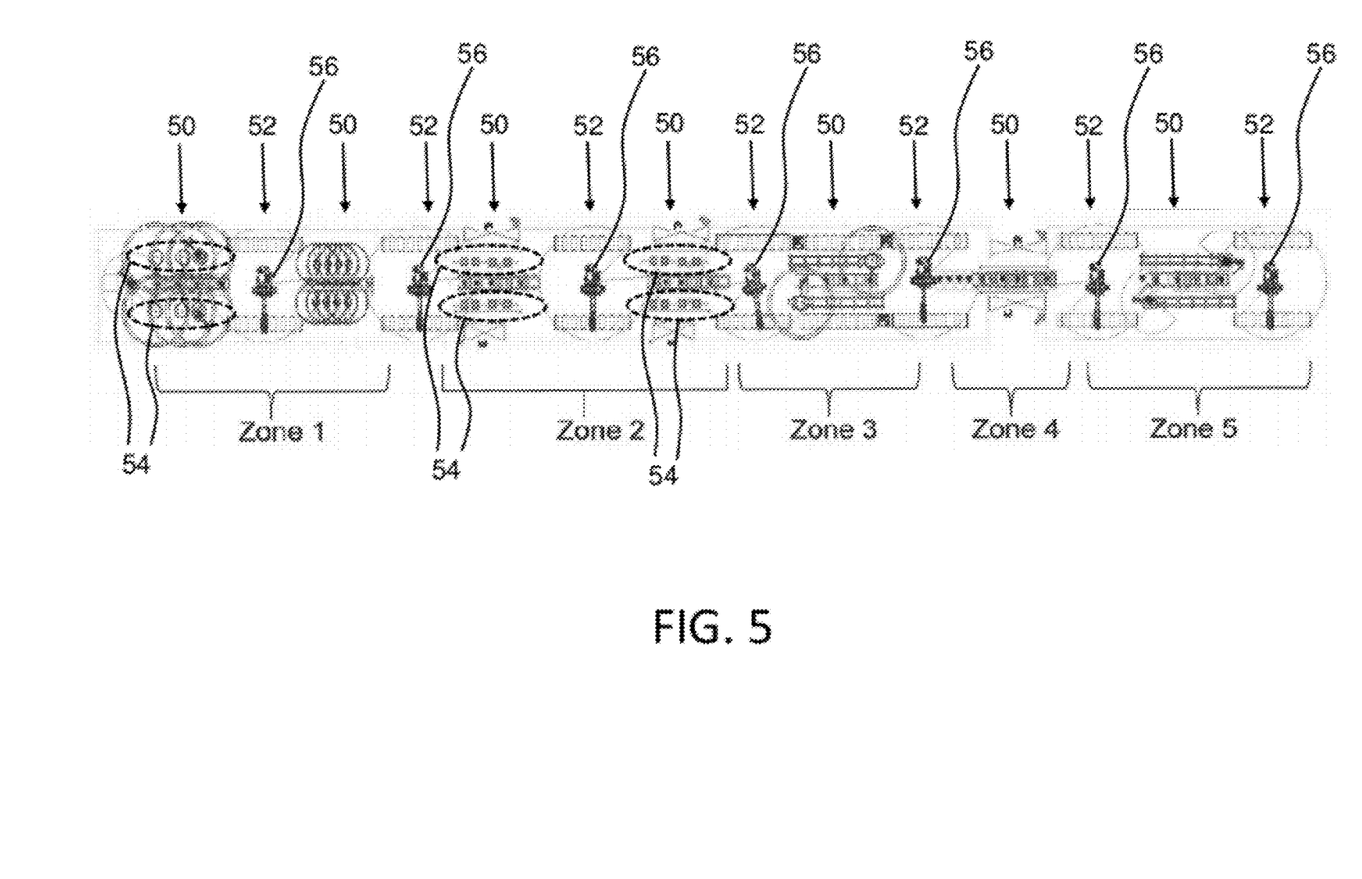
FIG. 5 is a top view of an assembly line according to an embodiment of the instant invention.

FIG. 5 is a top view of an assembly line according to an embodiment of the instant invention. By way of a specific and non-limiting example, the assembly line is a truck frame assembly line, wherein: zone 1 is frame marriage; zone 2 is frame bracket application; zone 3 is for robotic piercing of critical holes; zone 4 is weld inspection; and, zone 5 is dimensional inspection. The areas 50 along the length of the assembly line are product assembly areas, and the areas 52 along the length of the assembly line are tool-mounting areas. Adjacent to at least some of the areas 50 is a plurality of robots 54, which are for performing various functions for assembling and inspecting the product as it moves along the assembly line. Additional, larger robots 56 are situated within the areas 52 between the areas 50. The larger robots 56 are for detachably mounting tooling elements on the mobile bases, for transferring the product from one assembly station to the next, and/or for inverting the product as the product moves along the assembly line.

Figure 6:
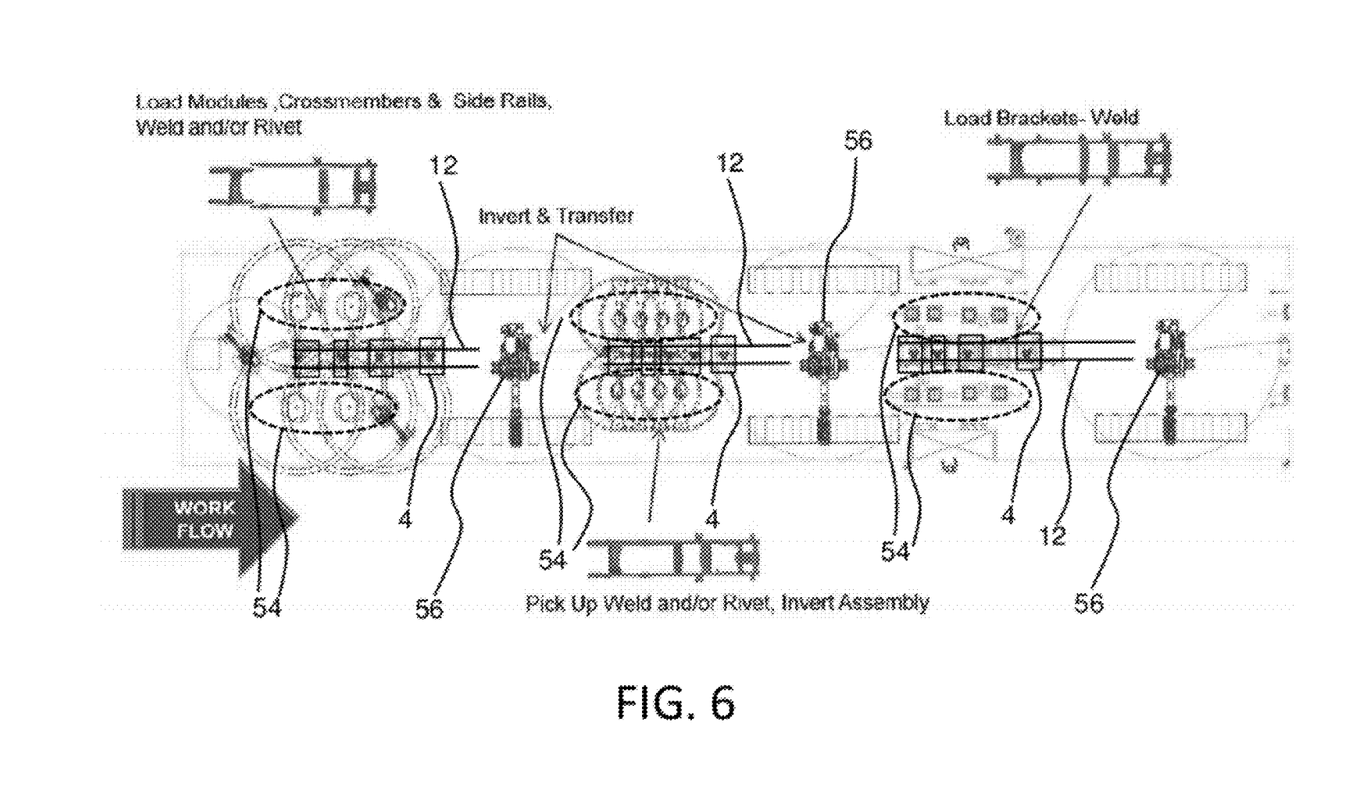
FIG. 6 is an enlarged top view showing zone 1 and zone 2 of the assembly line of FIG. 5; and, FIG. 7 is a simplified flow diagram of a method of operating an assembly line according to an embodiment of the instant invention.

Referring now to FIG. 6, shown is an enlarged top view showing zones 1 and 2 of the assembly line of FIG. 5. Guide tracks 12 extend between a product assembly area, which is located between robots 54, and a tool mounting area proximate the robot 56. Movable bases (only moveable base 4 has been labeled in order to preserve the clarity of the drawing) are positionable at different locations along the guide tracks 12, for supporting assembly of different products. The robots 56 are for detachably mounting tooling elements on the mobile bases, for transferring the product from one assembly station to the next, and/or for inverting the product as the product moves along the assembly line.

Figure 7:
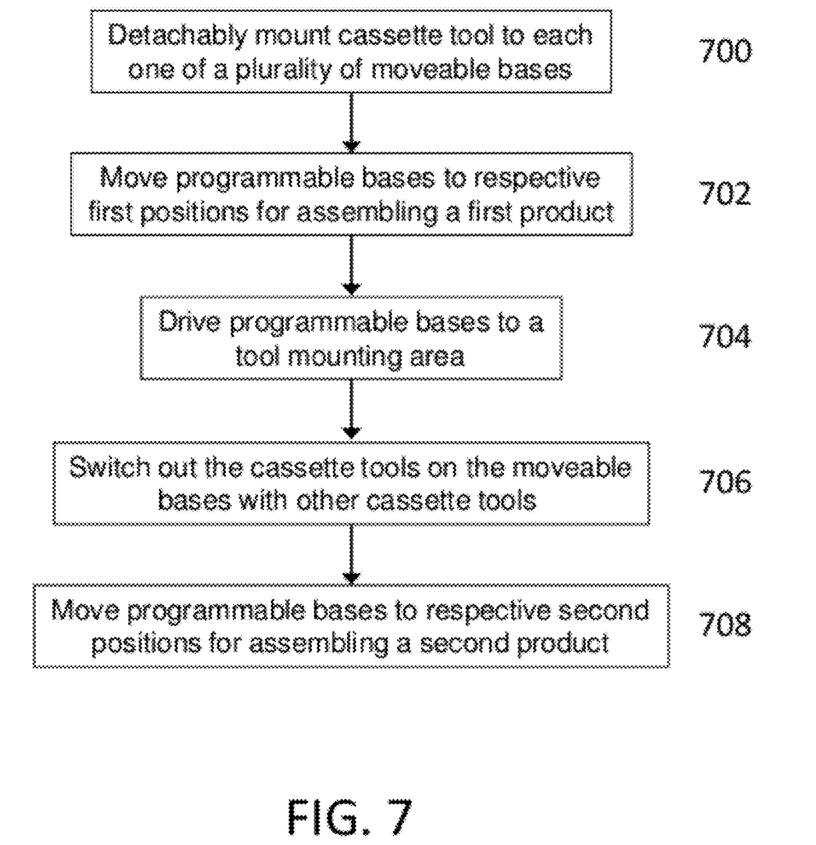

Referring now to FIG. 7, shown is a method of operating an assembly line according to an embodiment of the instant invention. At 700, a tooling element, in the form of a cassette, is detachably mounted onto each one of a plurality of moveable, programmable bases. At 702, under the control of a programmable logic controller, the programmable bases are moved to respective first predetermined positions for assembling a first product. In particular, the moveable bases are driven along a guide track using a driving system. In order to stop manufacturing the first product and begin manufacturing the second product, the moveable bases are driven at 704 along the guide track to a tool mounting area, and at 706, a robot is used to switch out the cassette tools on the moveable bases with other cassette tools that are stored on robot accessible shelves. Once the appropriate cassette tools are detachably mounted onto the moveable bases, then at 708 the moveable bases are driven along the guide track and stopped at respective second predetermined positions for assembling a second product. When the first and second products are different length variants, the respective first predetermined position is different than the respective second predetermined position for at least some of the moveable bases.

Using the systems and methods described above, it is possible to retool an entire assembly line having approximately 20 different stations in an automated fashion. The time that is required to retool the entire assembly line typically is no more than about five minutes.

It should be appreciated that the foregoing description is illustrative in nature and that the present invention includes modifications, changes, and equivalents thereof, without departure from the scope of the invention.

What is claimed is:

1. An assembly line system for manufacturing products that are dimensionally different on an assembly line with more than one production zone, comprising:
   a plurality of tooling elements for performing assembly functions on the products within a single production zone;
   a plurality of moveable base modules configured together to hold one of the products within the single production zone during the assembly functions, each base module having a mounting structure for detachably receiving a tooling element of the plurality of tooling elements; and
   a driving system configured to drive said base modules relative to one another to respective first positions within the single production zone for performing assembly functions on a first product and configured to drive said base modules to respective second positions within the single production zone in between performing the assembly functions the first product and a second product for performing assembly functions on the second product which is dimensionally different than the first product, and wherein said movement of said respective base modules between said respective first and second positions is confined to within the single production zone;
   wherein each tooling element is a cassette tool having a mounting structure for being coupled to the mounting structure of one of the base modules of the plurality of base modules; and
   wherein when one of the tooling elements is mounted onto one of the base modules, the mounting structure of the one of the tooling elements and the mounting structure of the one of the base modules are in alignment and cooperate to form a communication pathway that extends between the one of the tooling elements and the controller, and wherein the communication pathway for transmitting control signals from the controller to the one of the tooling elements is via the one of the base modules.

2. An assembly line system according to claim 1, wherein the driving system comprises a controller for receiving base module position data and for providing control signals for controllably driving each base module to its respective first position for assembly of the first product and for controllably driving each base module to its respective second position for assembly of the second product.

3. An assembly line system according to claim 2, wherein the driving system comprises a guide track and wherein each base module of the plurality of base modules is moveable along the guide track between an assembly area for assembly of the first and second products and a tool-mounting area for mounting of the tooling elements to the base modules.

4. An assembly line system according to claim 3, comprising a robot disposed proximate the tool-mounting area for mounting the tooling elements on the mounting structure of each of the base modules in an automated fashion.

5. An assembly line system according to claim 1, wherein the number of tooling elements of the plurality of tooling elements is greater than the number of base modules of the plurality of base modules.

6. An assembly line system according to claim 1, wherein the first product is a first vehicle frame having a first length and the second product is a second vehicle frame having a second length, the first length different than the second length.

7. An assembly line system according to claim 1, wherein a separation distance between two of the base modules is different when the two of the base modules are in the respective first positions than when the two of the base modules are in the respective second positions.

8. An assembly line system according to claim 1 wherein said plurality of tooling elements are detachably mounted to said base modules.

\* \* \* \* \*